United States Patent
Kim et al.

(10) Patent No.: US 7,565,243 B2
(45) Date of Patent: Jul. 21, 2009

(54) RAPID METHOD FOR RESERVOIR CONNECTIVITY ANALYSIS USING A FAST MARCHING METHOD

(75) Inventors: Chul-Sung Kim, Houston, TX (US); Mark Dobin, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 11/884,695

(22) PCT Filed: Apr. 10, 2006

(86) PCT No.: PCT/US2006/013230

§ 371 (c)(1),
(2), (4) Date: Aug. 20, 2007

(87) PCT Pub. No.: WO2006/127151

PCT Pub. Date: Nov. 30, 2006

(65) Prior Publication Data
US 2008/0154505 A1    Jun. 26, 2008

Related U.S. Application Data

(60) Provisional application No. 60/684,733, filed on May 26, 2005.

(51) Int. Cl.
*G06F 3/00* (2006.01)
(52) U.S. Cl. .............................. 702/2; 702/12; 702/13; 702/182
(58) Field of Classification Search ............... 702/2, 702/10, 11, 14, 16, 18, 182, 183, 186, 12, 702/13; 367/72, 182; 382/128; 700/245
See application file for complete search history.

(56) References Cited

U.S. PATENT DOCUMENTS

| | | | |
|---|---|---|---|
| 5,671,136 A | * | 9/1997 | Willhoit, Jr. .................. 702/18 |
| 5,757,663 A | | 5/1998 | Lo et al. ...................... 364/509 |
| 6,018,499 A | * | 1/2000 | Sethian et al. ................ 367/72 |
| 6,324,478 B1 | * | 11/2001 | Popovici et al. ............... 702/18 |

(Continued)

OTHER PUBLICATIONS

Berre, I. et al. (2005) "Fast Computation of Arrival Times in Heterogeneous Media," *Kluwer Academic Publishers*, XP-002352970, 25 pages.

(Continued)

*Primary Examiner*—Eliseo Ramos Feliciano
*Assistant Examiner*—Felix E Suarez
(74) *Attorney, Agent, or Firm*—ExxonMobil Upstream Research Company-Law Department (57) ABSTRACT

Methods for analyzing the connected quality of a hydrocarbon reservoir are disclosed. A model of a portion of the reservoir is divided into cells, each cell having a volume and some attributes, and wherein a speed function is assigned to a portion of the cells. A reference cell is chosen. A connectivity between cells in the reservoir is determined by solving an Eikonal equation that describes the travel time propagation, said propagating front progressing outward from a reference cell until an ending condition is met, said Eikonal equation being solved by a fast marching method with propagation velocity as a function of spatial position being provided by the speed function. Regions of the reservoir are characterized by their connective quality to the reference cell using the connectivity.

27 Claims, 10 Drawing Sheets

U.S. PATENT DOCUMENTS

| | | | | |
|---|---|---|---|---|
| 6,549,879 | B1 | 4/2003 | Cullick | 703/10 |
| 6,643,590 | B2 * | 11/2003 | Wiggins | 702/16 |
| 6,823,266 | B2 | 11/2004 | Czernuszenko et al. | 702/14 |
| 6,823,297 | B2 | 11/2004 | Jenny et al. | 703/2 |
| 6,839,658 | B2 * | 1/2005 | Causse et al. | 702/182 |
| 6,980,940 | B1 | 12/2005 | Gurpinar et al. | 703/10 |
| 7,027,927 | B2 * | 4/2006 | Matsuoka et al. | 702/11 |
| 2004/0148148 | A1 | 7/2004 | Butler et al. | 703/2 |

OTHER PUBLICATIONS

Daly, D. et al. (2004) "Characterisation and Modelling of Fractured Reservoirs: Static Model," *Euro. Conf. on Mathematics of Oil Recovery*, Cannes, France, 8 pages.

Karlsen, K. H. et al. (2000) "A Fast Marching Method for Reservoir Simulation," *Computational Geosciences*, 4, pp. 185-206 (XP002352969).

Parker, G. J. M. et al. (2002) "Estimating Distributed Anatomical Connectivity Using Fast Marching Methods and Diffusion Tensor Imaging," *IEEE Trans. On Medical Imaging*, 21.5, pp. 505-512.

Powell, H. W. R. et al. (2004) "Noninvasive In Vivo Demonstration of the Connections of the Human Parahippocampal Gyrus," *NeuroImage*, 22, pp. 740-747.

Sethian, J. A. (1999) "3-D Traveltime Computation Using the Fast Marching Method," *Geophysics*, 64.2, pp. 516-523 (XP002352971).

Zauderer, E. (1989) *Partial Differential Equations of Applied Mathematics*, $2^{nd}$ Ed., Wiley-Interscience, pp. 89-95.

PCT International Search and Written Opinion dated Sep. 15, 2006, 8 pages.

* cited by examiner

RAPID METHOD FOR RESERVOIR CONNECTIVITY ANALYSIS USING A FAST MARCHING METHOD

This application claims the benefit of U.S. Provisional Patent Application No. 60/684,733 filed on May 26, 2005.

BACKGROUND

Information on a reservoir's connectivity is critical for managing an exploration and production asset from exploration to abandonment. Connectivity assessments can greatly affect decisions made in all phases of an asset's life cycle, from optimally locating initial well locations, to improving reservoir management decisions later in the field's life. Estimation of connectivity at different scales and the ability to compare these connectivity assessments can provide insights to understanding risks associated with early gas and water issues in proposed wells, identifying better well operation procedures, ranking multiple realizations of geologic models, improving secondary field management decisions, and determining drainage areas and volumes.

SUMMARY

In general, one aspect of the invention features a method for analyzing the connected quality of a hydrocarbon reservoir. The method includes a model of a portion of the reservoir divided into cells, each cell having a volume and some attributes, and wherein a speed function is assigned to a portion of the cells. A reference cell is chosen. Connectivity for cells in the reservoir is determined by solving an Eikonal equation that describes the travel time propagation of a front progressing outward in a heterogeneous medium from a reference cell until an ending condition is met, the Eikonal equation being solved by a fast marching method with propagation velocity as a function of spatial position being provided by the speed function. Eikonal equations are a type of partial differential equation and are well known to those skilled in the art. Others may refer, for example, to *Partial Differential Equations of Applied Mathematics*, Erich Zauderer, $2^{nd}$ Ed., Wiley-Interscience (1989). Regions of the reservoir are characterized by their connective quality to the reference cell using the connectivity.

Implementations of the invention may include one or more of the following. The method may further include determining that the ending condition is met when a preselected minimum connectivity is reached, determining that the ending condition is met when a preselected distance from the reference cell is reached, or determining that the ending condition is met when the connectivity of a target object cell is determined. The method may further include determining an optimum connected path from one reference cell to another cell in the reservoir by generating the gradient of the connectivity of the cells from the reference cell and backtracking from the other cell to the reference cell or cells using the gradient. A cumulative attribute along the optimum connected pathway may be determined. The tortuosity of the optimum path may be determined by dividing the length of the path by the shortest line between the reference cell and the other cell.

The method may further include totaling desirable attributes of all cells with a connectivity greater than a preselected value.

The method may further include choosing multiple reference cells at different locations from each other in the reservoir. The most common example would be a pair of locations in the reservoir. With respect to each reference cell chosen, the connectivity between cells in the reservoir is determined by solving an Eikonal equation that describes travel time propagation, said propagating front progressing outward from a reference cell until an ending condition is met, said Eikonal equation being solved by a fast marching method with propagation velocity as a function of spatial position being provided by the speed function. Regions of the reservoir are characterized by their connective quality to the reference cell using the connectivity and the connectivities for each cell in the reservoir with respect the reference cells chosen are individually totaled for each cell. The method may further include determining that the ending condition is met when a preselected minimum connectivity is reached, determining that the ending condition is met when a preselected distance from the reference cell is reached, or determining that the ending condition is met when the connectivity of a target object cell is determined.

Desirable attributes of cells with a total connectivity greater than a preselected connectivity value may be totaled.

The method may further include determining an optimal path between a first and a second reference cell by way of a desired cell. The gradient of connectivities with respect to the first reference cell is generated and backtracking from the desired cell to the first reference cell using the gradient is performed. The gradient of connectivities with respect to the second reference cell is generated and backtracking from the desired cell to the second reference cell using the gradient is performed. The method may further include determining an nth optimal path between a first and a second reference cell. Cells in the reservoir are ranked by the cells' total connectivity. The cell or cells with the nth ranked total connectivity is chosen for the desired cell.

The method may further include choosing a portion of the cells in the reservoir as reference cells. For each reference cell, the connectivity between cells in the reservoir is determined by solving an Eikonal equation, said propagating front progressing outward from a reference cell until an ending condition is met, said Eikonal equation being solved by a fast marching method with propagation velocity as a function of spatial position being provided by the speed function. Regions of the reservoir are characterized by their connective quality to the reference cell using the connectivity. A total desirable attribute, $V_{boundary}$, for each reference cell is determined by totaling desirable attributes of all the cells in the reservoir with a connectivity with respect to the reference cell greater than a preselected value. The method may further include determining that the ending condition is met when the connectivity of a target object cell is determined. The method may further include choosing reference cells for which the total of the corresponding cell indices may be even. The $V_{boundary}$ for the cells in the reservoir not chosen as reference cells may be determined using an average of the $V_{boundary}$ of neighboring cells that were chosen as reference cells. The method may further include choosing reference cells for which the corresponding cell indices are all even. The $V_{boundary}$ for the cells in the reservoir not chosen as reference cells may be determined using an average of the $V_{boundary}$ of neighboring cells that were chosen as reference cells.

The method may further include using geological attributes to determine a speed function. The method may further include adapting the fast marching method to restrict front propagation to one or more specified directions. The method may further include determining a speed function by a direction of front propagation of the fast marching method. The speed function may be generated using porosity data. It may be a linear function, a nonlinear function, or a nonlinear step function.

BRIEF DESCRIPTION OF THE DRAWINGS

FIG. 15 illustrates the determination of the connectivity between a production well and an injection well by way of any given cell in between.

DETAILED DESCRIPTION

The techniques presented generally relate to the analysis of the connective quality of regions of a subsurface hydrocarbon reservoir by propagating a front or fronts using a well known technique called the "fast marching method." (For an example of the fast marching method, see J. A. Sethian, "Level Set Methods and Fast Marching Methods," *Cambridge University Press*, 1999.) In some embodiments of the invention, adapted versions disclosed herein of the fast marching method are used. One use of this technique is to provide a rapid method for characterizing the quality of connectivity within a hydrocarbon reservoir. The input to this method can include seismic models, geologic models or simulation models which contain a description of the subsurface geology. These models are usually subdivided into small divisions which are referred to as cells. These cells may be small cubes or some other geometric shape that represent small portions of the reservoir and contain information on the portion's physical or chemical properties, such as density, porosity, lithologic facies, etc.

Figure 1:
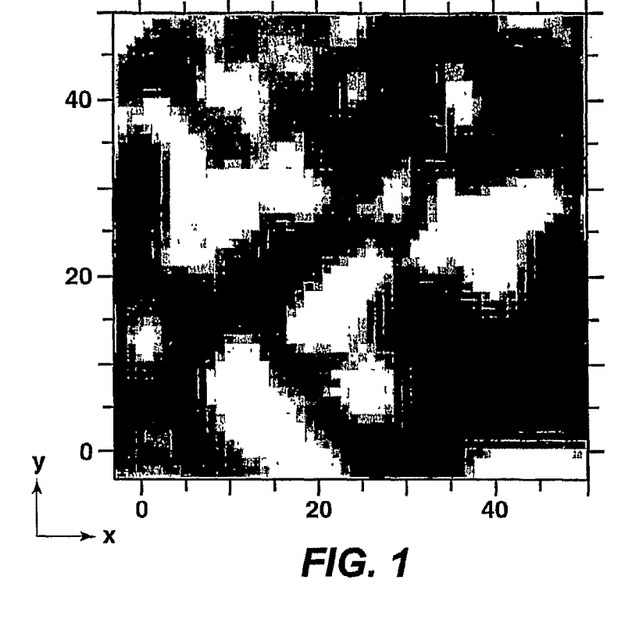
FIG. 1 illustrates the porosity of a reservoir derived from seismic data.

The speed of the propagating front through the reservoir model is dictated by the speed assigned at each cell by a user. The speed is defined to be a proxy to represent how hydrocarbons or other substances flow through the model. In this technique multiple speed functions and modifiers can be defined, enabling more complex geology and geometries to be incorporated into this technique of quantifying the connective quality. One example of information that can be used to assign a speed to a cell is shown in FIG. 1: a two-dimensional seismic scale model where each cell has a seismic derived porosity as its attribute value. In FIG. 1, higher values of porosity are represented by lighter shades and the darker shades represent lower values of porosity. In other examples, the speed of the propagating front through a cell can depend on the direction of the propagation of the front. For instance, factors such as gravity can be accounted for by assigning slower speeds for propagation directions that work against gravity.

The propagation can be started from a single cell or a group of cells referred to as reference cells. The speed of the propagating front through the reservoir model is dictated by the speed functions. The front is propagated so as to compute travel times from the reference cell to the other cells in the reservoir, each cell having its own travel time. These times are also called arrival times in reference to the time it takes for the propagating front to arrive at a cell from the reference cell. These arrival times represent the connective quality of the cells in the reservoir from the reference cell. The longer a hypothetical propagating front takes to reach a cell, the poorer the cell's connective quality to the reference cell. Therefore, the quality of connectivity is inversely related to the travel time. Higher travel times represent a poorer connective quality and lower times represent a higher connective quality. The travel times are calculated by submitting the speed function to the fast marching method—a fast numerical method that allows travel times to be computed given a speed function. The fast marching method is utilized to compute the arrival times at the cells of the propagating front until an ending criteria is met, i.e., a maximum arrival time is reached, a maximum distance is reached, or the propagating front reaches a target object.

Figure 2:
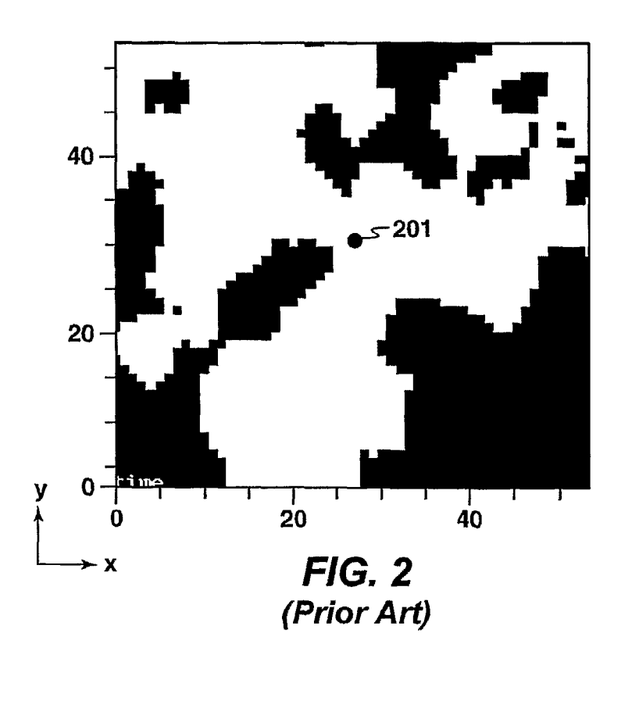
FIG. 2 illustrates a threshold based region growing or seed detection method for analyzing the connectivity of a reservoir.

The following is a detailed example of the present technique. The example begins with a choice of a speed function, which dictates the speed of the propagating front. The speed of propagation of the hypothetical front through the neighboring cells is defined by a user to approximate the transmissibility/hydraulic connectivity of the cells in a model. The time it takes for the front to move from a reference cell to another cell is representative of how well the two cells are connected. This approach allows the quantification of the connectivity of a reservoir using fast marching techniques. These techniques solve partial differential equations describing front propagation, instead of using Lagrangian geometric approaches such as threshold based region growing or seed detection techniques and graph theory based techniques. FIG. 2 shows the results of threshold based techniques, with block 201 as the reference cell. The image shown is a black and white image that conveys connectedness as an either/or proposition: either the cells are connected (colored white) or they are not connected (colored black). Compared to this result, the method described in this invention computes connective quality to all the cells in the model in continuous values providing degrees of connectedness. The basic computational module is a numerical method that computes a propagating interface (the location of the propagating front) from an initial interface (the reference cells) expanding outward, where the speed at each cell is all positive.

The Eikonal equation describing the front propagation in two dimensions (the technique is similar in three dimensions) is:

$$|\nabla T|F=1 \quad (1)$$

$$T(x,y)=0 \text{ on } \Gamma(t=0), \quad (1a)$$

Where $\Gamma(t=0)$ is the initial location of the interface at time t=0, $$\text{Front}=F(t)=\{(x,y)|T(x,y)=t\},$$

T(x, y) is the time of arrival at a cell located at (x, y), and F(x, y) is the speed of the propagation at a cell (x, y).

Figure 3:
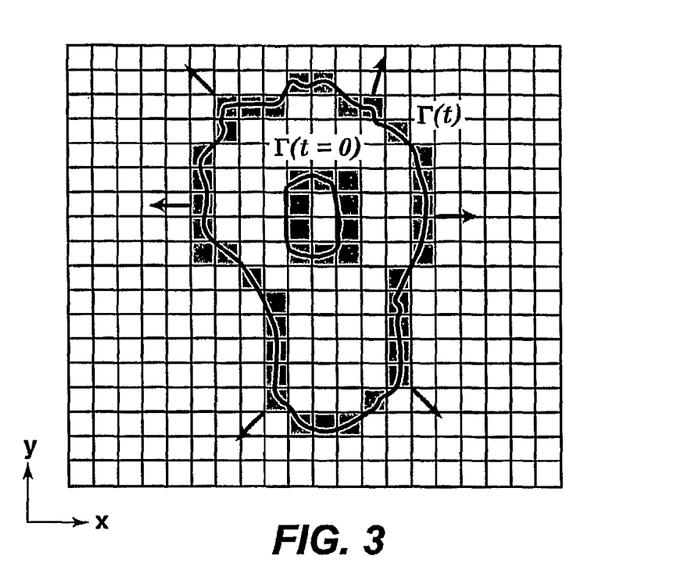
FIG. 3 illustrates fast marching method in two dimensions.

The fast marching method, a numerical technique well known in the art, is employed to compute T(x, y) at all cell locations given the initial condition specified in equation (1a) and the speed F(x, y) at all (x, y) locations. FIG. 3 shows the initial front $\Gamma(t=0)$ and the position of the expanding front $\Gamma(t)$, which is the collection of cells that have the same arrival time T(x, y)=t in a two dimensional space. In the example shown, the speed F(x, y) depends only on position. The fast marching method is used to solve the equation (1) above to compute the quality of connectivity in a model. The technique can also be adapted, as will be shown below, to accommodate various geologic characteristics that affect the transmissibility of a cell. Consequently, this technique has many applications in hydrocarbon exploration and production settings.

Figure 4:
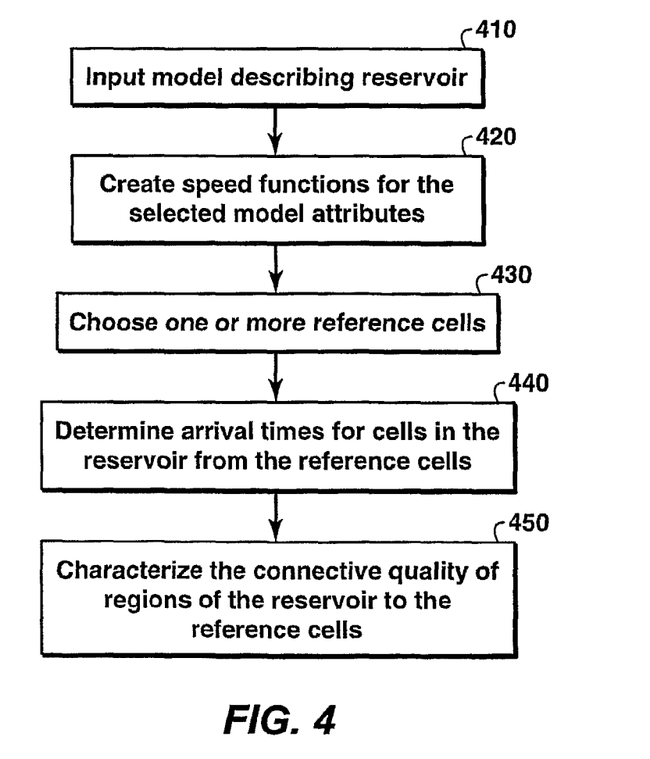
FIG. 4 illustrates a flow diagram for executing the reservoir connectivity analysis.

With reference to FIG. 4, an example system begins with an input model describing a reservoir's geology and structure in the form of reservoir volume of cells (block 410). The speed functions are then inputted to provide a speed for selected attributes from the input model that represent the reservoir's geology (block 420). A speed function may be defined for all or fewer than all attributes. It may also be defined for all or fewer than all cells in the reservoir. The speed function need not be expressible in analytically closed form. The speed function F(x, y, z) is defined for a model using various information from seismic data, well log data, interpreted structural/stratigraphic geology, and/or predicted permeability/relative permeability available during the modeling process. A unique speed function can be assigned to specific facies or discrete attributes and be adjusted to account for varying cell scales and vertical/horizontal permeability differences. A simple speed function can be designed by using a predicted porosity derived from seismic amplitudes and a set of relationships observed between porosity and permeability values specific to the geologic model. In general the propagation is omni-directional, but options are provided to allow the propagation to be restricted to only going horizontally and up or horizontally and down.

Reference cells are then chosen (block 430). These reference cells can be a cell or a group of cells at the perforation intervals of an injection/production well, a group of cells that form gas/oil or water/oil hydrocarbon contacts, geologic surfaces, or three-dimensional regions or a variety of other points or boundaries that would be of interest. The ability of the fast marching method to either propagate a front from a single source or propagate multiple fronts simultaneously from multiple sources to multiple targets enables this technique to be applied to a diverse set of problems.

Figure 5:
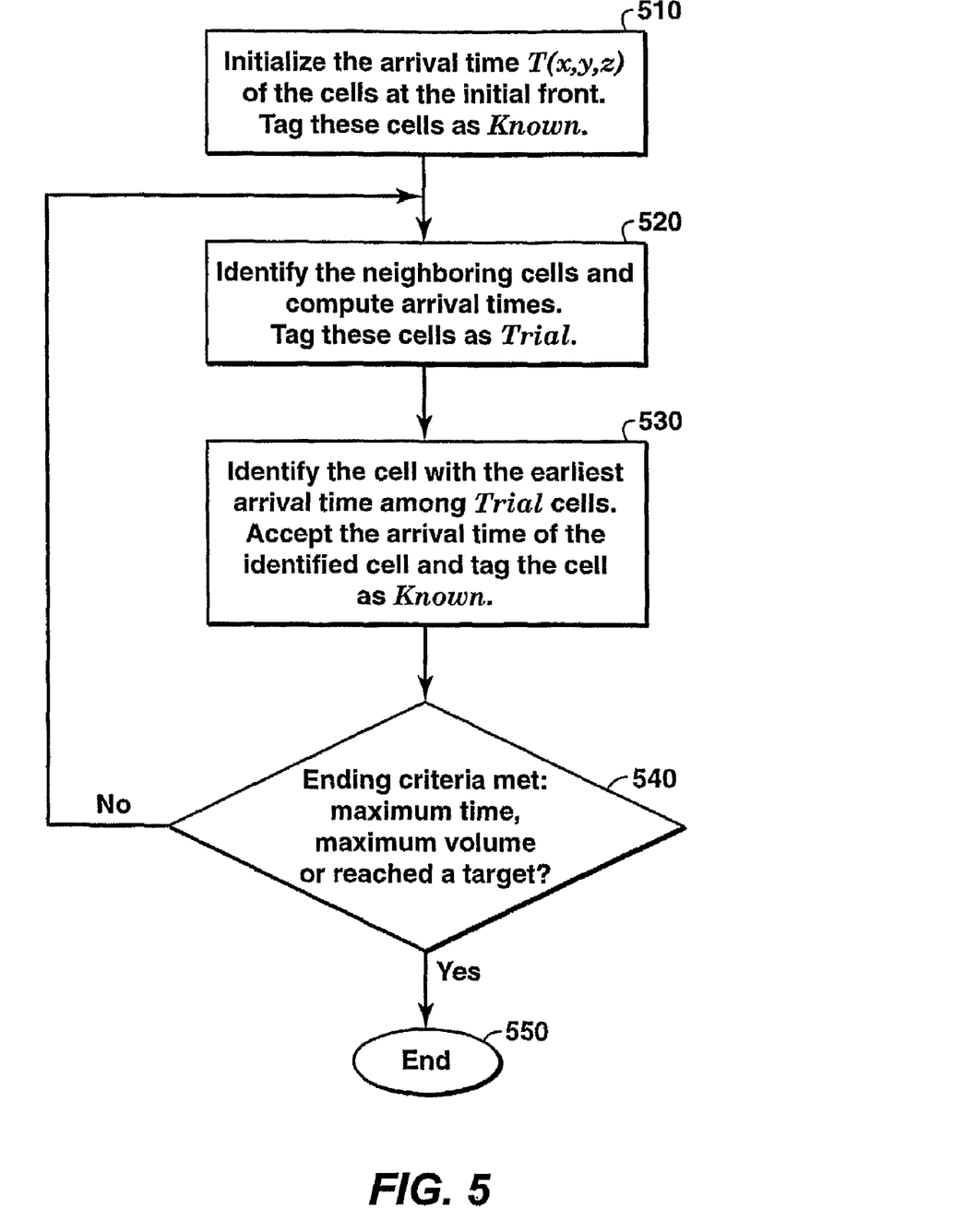
FIG. 5 illustrates a flow diagram for determining arrival times using a fast marching method.

Arrival times for cells in the reservoir volume are then computed (block 440), as shown in detail in FIG. 5. The connective quality of regions of the reservoir can be characterized using the arrival times (block 450). In the technique shown in FIG. 5, an initial hypothetical front is propagated and a fast marching method is used to solve Equation (1) and compute the arrival times for the cells in the reservoir. To start, the reference cells at the initial front $\Gamma(t=0)$ are given an arrival time of zero (block 510). These cells are then tagged as Known, meaning the time of arrival is known (block 510). Next, all the neighboring cells of the Known cells that are not tagged as Known are tagged as Trial (block 520). In one example, two cells are neighbors if they share a common face in three dimensions and a common edge in two dimensions. All the other cells are tagged as Far. Then, the time of arrival to the Trial cells are computed (block 520) using the fast marching method. The cell with the earliest arrival time among the current Trial cells is tagged as Known, and the time of arrival on that cell is accepted as the arrival time of that cell (block 530). The arrival time of the newly accepted cell is the current time of propagation of the front.

The example system repeats (blocks 520 and 530) until an ending criterion is met (block 540). For example, propagation can be stopped when a predetermined maximum arrival time, $T_{max}$, is reached, a cumulative attribute is reached, a distance is reached, or the propagating front reaches a certain target object. When the ending criterion is met, the process ends (block 550).

Figure 6A:
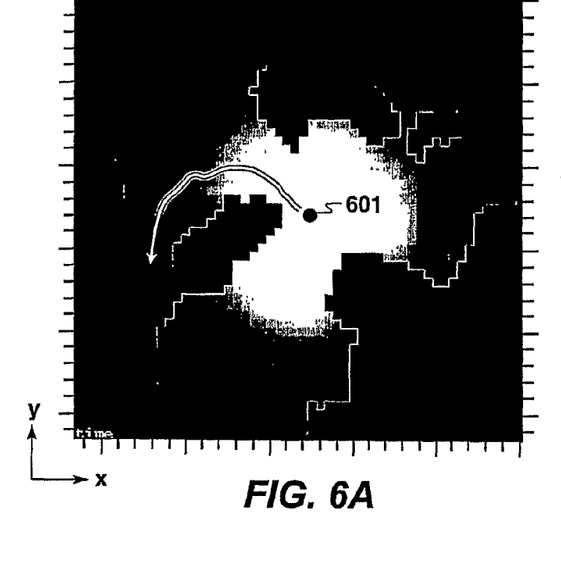
FIG. 6A illustrates the connectivity of a reservoir calculated using the step speed function shown in FIG. 6B.
Figure 7A:
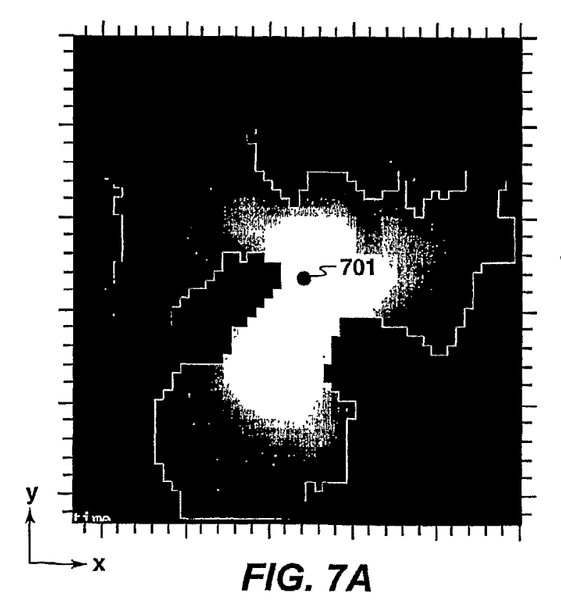
FIG. 7A illustrates the connectivity of a reservoir calculated using the nonlinear speed function shown in FIG. 7B.

When the propagation is stopped, block 450 in FIG. 4 is reached and the connective quality of the region of the reservoir for which arrival times have been computed is characterized with respect to the reference cells chosen. There is an inverse relationship between the arrival times and the connective quality of a cell. This relationship is represented as follows: $Q(x, y) \propto 1/T(x, y)$, where Q is the quality of connectivity and T is the arrival time. The higher the arrival time, the lower the quality of connectivity and the lower the arrival time, the higher the quality of connectivity. FIGS. 6A and 7A demonstrate the most basic characterization using the present example, i.e., the porosity model of FIG. 1. The black dot at the center represents the reference cell. The regions with lighter shades represent areas of high connective quality to the reference cells. The darker shades represent areas with poorer connective quality to the reference cells. In practice, data displays such as FIGS. 6A and 7A (as well as FIGS. 1, 8, 10, 11, 14 and 16-20) would preferably utilize color instead of gray scale. It should be understood that connective quality and arrival time are used synonymously, but that the arrival time is inversely related to connective quality.

This characterization of the connective quality of a reservoir under the present example has many applications. In one application, totaling the attributes, i.e., the producible oil, porosity, geometric volume, or percent shale, for each cell that the front propagates through after a preselected amount of time or at a given connectivity provides a continuous estimate of the cumulative attribute of the propagated cells at a given propagation time. In the case where the attribute is the volume of oil producible from an individual cell, this volume can be determined using the porosity volume of the cell multiplied by the average recovery factor for the field or reservoir. The porosity volume of the cell is computed by multiplying geometric cell volume by the porosity attribute.

The following example illustrates the current technique using very simple speed functions and the effect the choice of a speed function has on the determined connectivity. Although the present example applies equally well for a three-dimensional model, a two-dimensional example is used for the purpose of clarity in explanation. FIG. 6A shows the arrival time T(x, y) at each cell (x, y) from the reference cell identified by block 601 computed by propagating a front according to Equation (1) using the following speed function (illustrated in FIG. 6B) on the two-dimensional model in FIG. 1:

$$F(x,y)=1 \text{ for } \phi(x,y) \geq 25$$

$$F(x,y)=0 \text{ for } \phi(x,y) < 25 \quad (2)$$

For this speed function, the speed of a cell equals 1 where its porosity, $\phi(x, y)$, is greater than or equal to 25. The speed of a cell equals 0 where its porosity is less than 25. FIG. 6A illustrates the arrival times computed using this speed function. Earlier arrival times are shown in lighter shades and later arrival times are shown in darker shades. The speed function in Equation (2) is equivalent to the threshold values used in a traditional seed detection technique illustrated in FIG. 2. FIG. 2 is a black and white image that conveys connectedness to the reference cell as an either/or proposition: either the cells are connected (white) or they are not connected (black). FIG. 6A, however, shows the arrival times at each cell in different shades, representing the connective quality of the cell. Connectedness under the present technique is not an either/or proposition but one of degree.

Figure 6B:
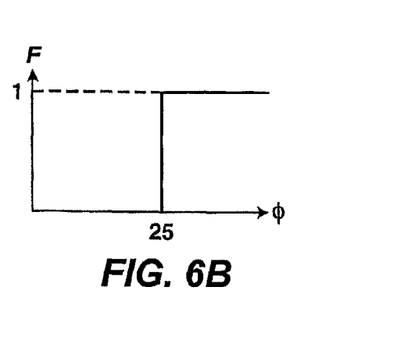
Figure 7B:
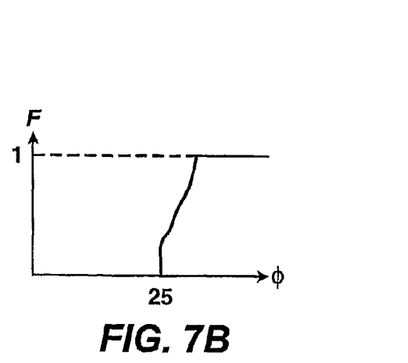

The speed function does not have to be a step function like the one described in Equation (2) and illustrated in FIG. 6B. For example, the relationship between the speed of propagation and the seismic porosity may be better described by a nonlinear function such as that shown in FIG. 7B. FIG. 7A shows the computed arrival times from the reference cell identified by block 701 using the nonlinear speed function of FIG. 7B on the two dimensional porosity model in FIG. 1. The travel time differences observed between the two cases in FIG. 6A and FIG. 7A show the effect of the choice of a speed function. This example illustrates the incorporation of geologic knowledge, such as a nonlinear relationship between porosity and the connectedness, in setting the speed function. In other cases, if a certain facies and depositional environment is known to affect the speed of propagation, the speed function can be designed to reflect those characteristics.

The following example technique describes the use of the present technique to determine cumulative attributes inside a propagating front when propagation is stopped at a given distance. This example technique incorporates the geologic heterogeneity of a reservoir allowing estimated cumulative attributes, such as drainage volume results, to be used to help identify potential well locations and possibly assess competitive drainage situations. First, the initial propagating interface, or reference cell or cells, is located at perforations of a vertical/horizontal well. For a given model, a user specifies the speed of propagation of each cell according to information associated with transmissibility such as permeability and facies of a model. Next, a hypothetical front is propagated to determine the arrival times of the other cells from the reference cells. The propagation is stopped when a desired distance is reached. The desired attributes of the propagated cells are then totaled to determine the cumulative attribute. In the case where a drainage volume is desired, the producible volume of a cell is the attribute that is totaled.

Figure 8:
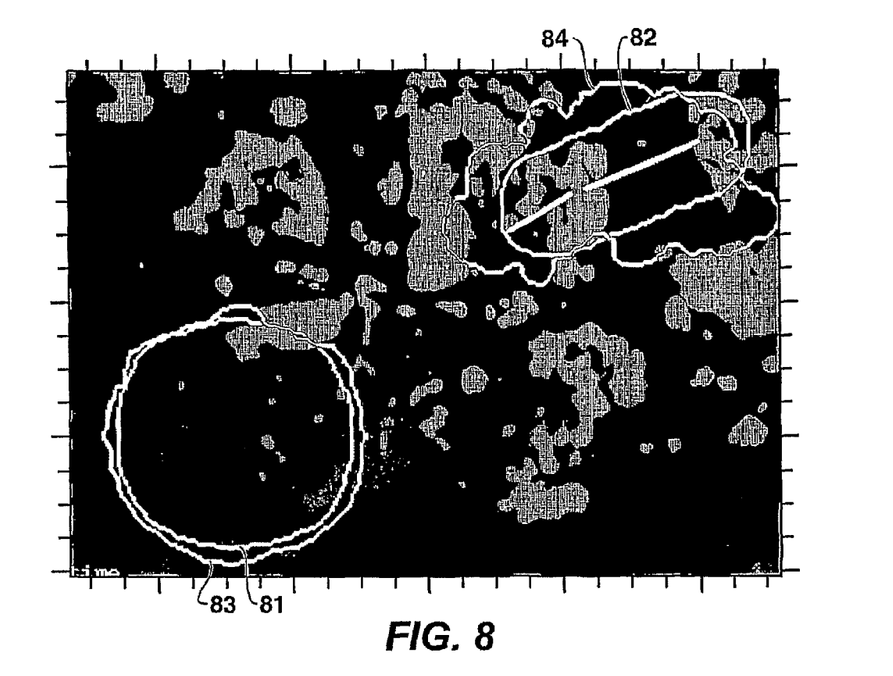
FIG. 8 illustrates the drainage area of a well estimated by a traditional method versus the present technique.

The following example technique describes the use of the present technique to determine a drainage region. In this case, the propagation is stopped when the volume of the oil from the propagated cells exceeds the amount of oil produced. The location of the front at that instant is a simple approximation for the drainage region of the well bore. The fast marching method is well suited for this application because it propagates to one cell at a time and enables computing the cumulative recoverable oil volume while the front is being propagated. FIG. 8 shows the estimated drainage area obtained by a traditional method (circle 81 and oval 82), and the drainage area estimated by the present technique (circle 83 and oval 84). FIG. 8 is a view from above of a vertical well (within circles 81 and 83 on the left side of FIG. 8) and a horizontal well (within ovals 82 and 84 on the right side) in a map view of a three-dimensional model showing only the oil leg. The cells with lighter shades represent the highest speed and the textured cells represent the lowest speed. Cells with intermediate speed are rendered transparent and are shown in black in FIG. 8. The drainage regions estimated by both methods for the vertical well are similar because the geological attributes surrounding the well are relatively uniform. Some traditional methods assume a uniform distribution of oil and use the same average porosity for all the cells in the surrounding area. Although the example technique does not make this assumption, the speed of propagation is more or less homogeneous in the surrounding area due to the geological uniformity around the vertical well. As a result, the drainage area predicted by the technique is also uniform around the well. However, with respect to the drainage areas for the horizontal well, large differences are shown between the present and traditional techniques. Heterogeneous porosities and geological attributes around the well bore create heterogeneous speeds. This results in a more differentiated indication of a drainage region (84) by the present method, compared to the uniform prediction of the traditional method (82).

Figure 9:
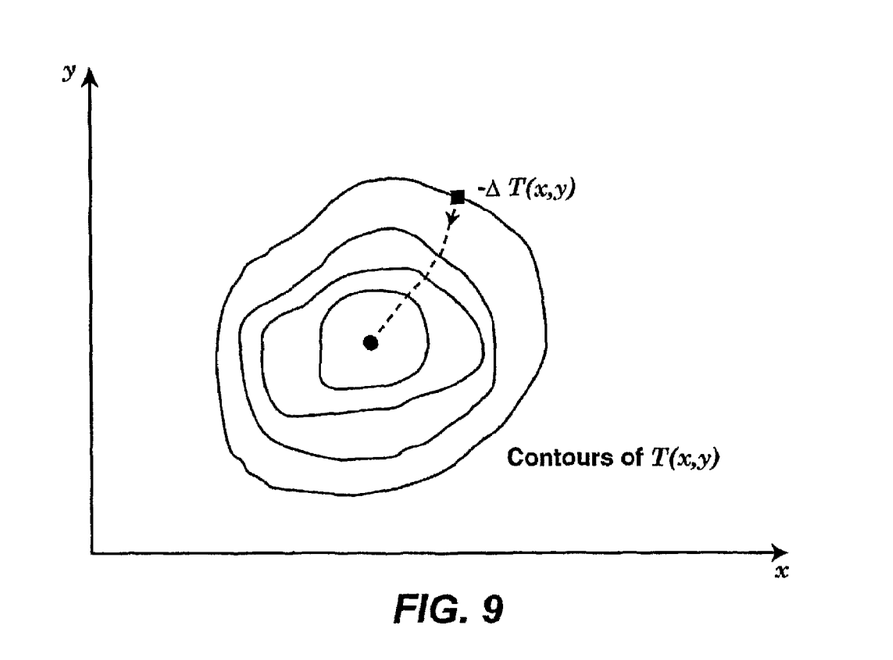
FIG. 9 illustrates the determination of an optimum connected path between a target cell and a reference cell in a reservoir model.

The present technique can also be used to determine optimal connected pathways between points of interest. The arrival times $T(x, y, z)$ or the connected qualities $Q(x, y, z)$ of the cells in the reservoir model can be used to find the optimal path from the source or a reference cell or cells to a cell at $(x_f, y_f, z_f)$ by computing the gradient $\nabla T(x_f, y_f, z_f)$ and backtracking from $(x_f, y_f, z_f)$ through the gradient until the source of the propagation is reached. FIG. 9 illustrates this technique generally in two dimensions. At the center of FIG. 9 is a reference cell surrounded by contours. Each contour surrounding the reference cell represents the propagating front at a particular time. FIG. 9 illustrates that by computing the gradient of the arrival times, an optimum path can be traced from the square-shaped cell at $(x, y)$ back to the round-shaped reference cell. The optimum path to a cell from a reference cell chosen at a perforation is shown in purple in FIG. 6. This optimum path shows the highest quality path from a perforation to a cell of interest, which could be hard to find and of great interest in a three-dimensional model. In addition, several characteristics of the optimum path can be determined. For instance, the cumulative attribute of the path can be determined by totaling any desired attribute of each cell along the path. Also, the tortuosity of the path can be determined by dividing the length of the path by a shortest line between the ends of the path. These measures may provide added insight into the connected quality of the path.

The present technique can also be used to determine the cumulative attribute (e.g., net porosity volume, cumulative hydrocarbon, etc.) for a well location before a water or gas break or other condition occurs. For a well where a key risk is a water/gas or other undesirable condition, it would be useful to predict a cumulative attribute before a break occurs. In addition, it would be useful to know the probable connected pathways between a well bore and water/gas or other boundary contacts. For an existing well, this connectivity analysis could provide insight when trying to establish a production strategy that will avoid or delay a gas or water break or other undesirable condition and at the same time maximize production from that well. For a new well, this connectivity analysis will help determine a well location that will lower the risk of gas/water/boundary breaks. The technique is described as follows. An initial propagating front is located at one or more cells of a geologic/reservoir model that corresponds to the locations of perforation intervals. The front is propagated until it reaches a water, gas, or other boundary. All of the cells that are inside the final propagating front $\Gamma_{break}$ have higher quality connectivity than a path from the perforation to the gas/water or other boundary contact. An attribute of these cells is totaled and the total volume $V_{break}$ that is contained inside the final propagating front $\Gamma_{break}$ is determined. $V_{break}$ could reflect, for instance a producible volume, determined using the porosity of each cell and its conversion factor. In this case, this technique does not necessarily compute the most accurate oil volume $V_{break}$ that can be produced before a gas/water or other boundary break. A producible oil volume can be more accurately predicted by using a reservoir simulation technique that solves differential equations describing a dynamic behavior of fluid movement in a porous media. However, the volume $V_{break}$ obtained with this method can be used as a proxy measure for predicting the producible oil volume that would otherwise be obtained by using the more computational intensive mathematics of reservoir simulation. Also, the technique described above for finding pathways between cells may be used to identify pathways to the gas/water/boundary contact. These pathways provide added insight into the behavior of a well performance. These pathways can also be used in the history matching process to help identify areas within the well that are connected to contacts and the relative timing of these connected pathways. This could help facilitate the history match process by providing additional geologic control for the reservoir engineer when they are trying to validate where in the well the actual hydrocarbons could be originating from and reduce the number of simulations runs in order to get a good history match.

Figure 10:
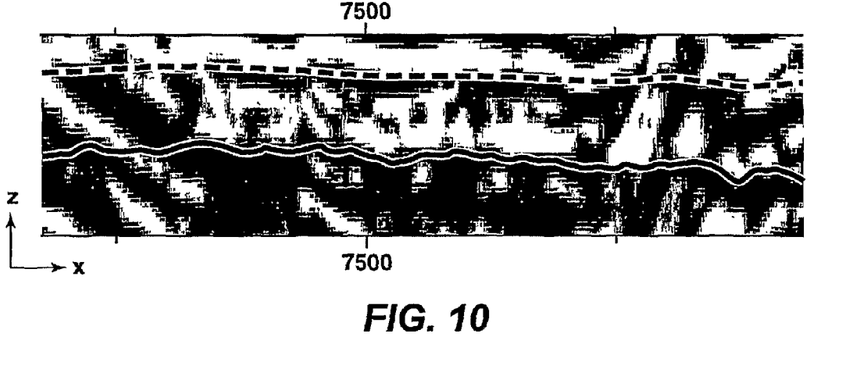
FIG. 10 illustrates a cross section of a seismic scale model with seismic derived porosity shown in gray scale.
Figure 11:
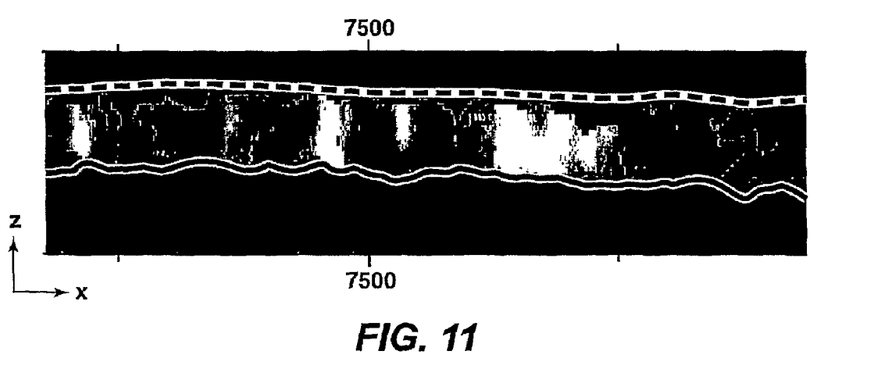
FIG. 11 illustrates a cumulative attribute, such as a producible oil, volumes before a gas or water break determined by the present technique.

In another application, the present technique may be used to determine well candidates that maximize a desirable attribute, i.e., the volume of producible oil or the total porosity, before any potential gas/water/boundary break. For a reservoir where a key risk is a water/gas or other boundary break, it would be useful to determine candidate well locations in a geologic model that have a large drainable pore volume before a water/gas or other boundary break occurs. FIG. 10 shows a cross section of a seismic scale model with the seismic porosity of each cell in gray scale and the gas/oil or water/oil contacts indicated by the dashed line and the solid line, respectively. Without a connectivity analysis tool introduced in this example, an analyst would attempt to find a well location by visually looking for a large body of a reservoir that has high permeability/porosity and is well protected from water or gas contacts. With the present invention's connectivity analysis technique (lighter shadings) in this example, the maximum cumulative desirable attribute attainable, e.g., attainable oil volume or porosity, from a perforation at (x, y, z) can be obtained; said maximum cumulative attribute determined at the time a gas ($V_{x,y,z,gas\_break}$) or water ($V_{x,y,z,water\_break}$) break occurs. This can be accomplished by first propagating a front from a reference cell located at (x, y, z). The front is propagated until a water, gas, or other boundary is reached. The desired cumulative attribute of the cells which the front propagated through are totaled and stored for the cell at (x, y, z). This process may be repeated for all the cells in the reservoir. This cumulative attribute can be used to effectively predict the oil volume, net porosity volume, or some other cumulative attribute prior to a water/gas or other boundary arrival. The efficiency of the present technique allows each cell in a given model of multimillions of cells to be treated as a reference cell. FIG. 11 shows a cross section of cells with $V_{x,y,z,gas\_break}$ or $V_{x,y,z,water\_break}$ values in gray scale: lighter shades for large drainable volume and darker shades for a low drainable volume. These values, $V_{x,y,z,gas\_break}$ or $V_{x,y,z,water\_break}$, represent the likely volume of oil producible from a reference cell before a gas/water/boundary break. The resulting three-dimensional model with these values in its cells is a risk volume. This risk volume, along with other information, can be used to select new well sites in a manual or numeric optimization approach.

Figure 12A:
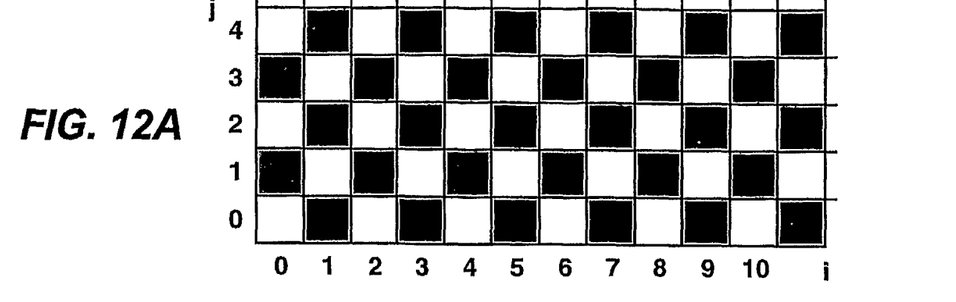
FIG. 12 illustrates the half decimation technique.
Figure 12B:
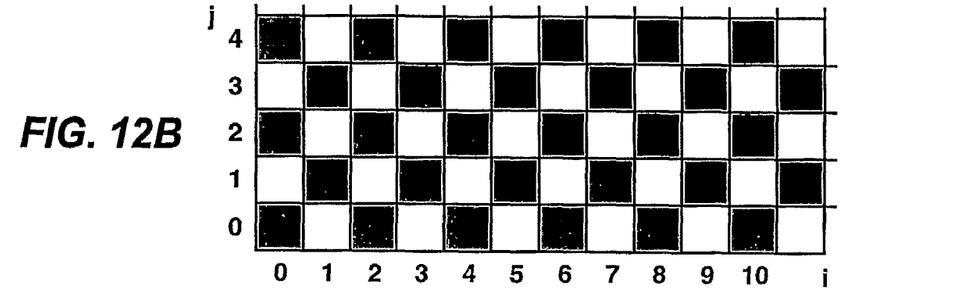
Figure 13A:
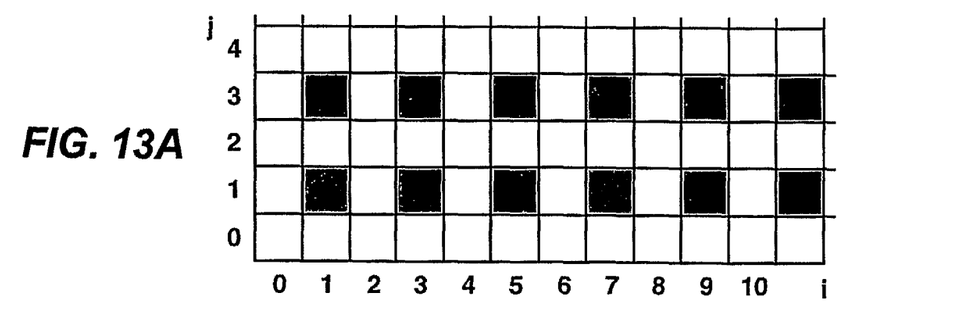
FIG. 13 illustrates the quarter decimation technique.
Figure 13B:
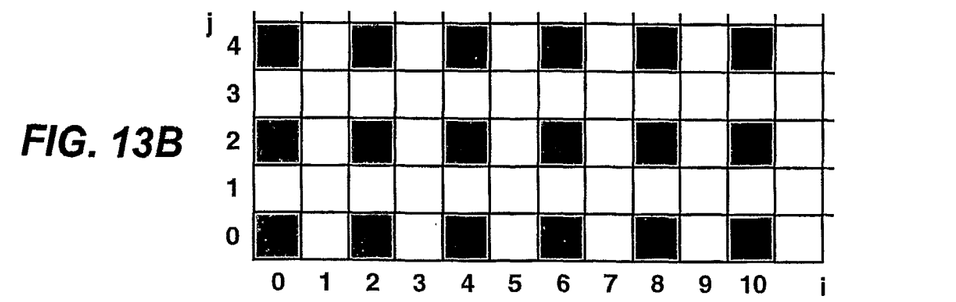

Although the fast marching method is an efficient numerical technique for solving Equation 1, the computation of a risk volume of potential water/gas break for a multimillion cell model could still take on the order of hours. In an effort to reduce the time needed to generate a risk volume, a half-decimation, quarter-decimation, or other similar scheme may be used. In a half-decimation scheme, illustrated in FIGS. 12A and 12B, $V_{x,y,z,gas\_break}$ or $V_{x,y,z,water\_break}$ is computed for the cells in the reservoir for which the sum of the cells' corresponding cell indices i, j, and k are even. These cells are shaded in FIGS. 12A and 12B. (Alternatively, the sum of the cell indices could be odd.) FIG. 12A demonstrates a horizontal slice where (for the shaded cells) the sums of the cell indices are even when k is odd, and FIG. 12B demonstrates a layer where the sums are even when k is even. In a quarter-decimation scheme, illustrated in FIGS. 13A and 13B, $V_{x,y,z,gas\_break}$ or $V_{x,y,z,water\_break}$ is computed for the cells for which all the cell indices are even or all the cell indices are odd, i.e., i, j, and k for a given a cell are all even numbers or i, j, and k for a given cell are all odd numbers. These cells are shaded in FIGS. 13A and 13B. FIG. 13A demonstrates an example horizontal slice where all the cell indices (for the shaded cells) are all odd when k is odd, and FIG. 13B demonstrates a layer where all the cell indices are all even when k is even. For a cell, where $V_{x,y,z,gas\_break}$ or $V_{x,y,z,water\_break}$ was not computed, the volume at a gas or water break is estimated as an average of the oil volumes computed at the first order neighboring cells. In the half-decimation case, there are 14 neighboring cells that have oil volume computed. In the quarter-decimation, there are six neighboring cells that have oil volume computed. The resulting risk volume maintains the accuracy needed in selecting new well sites with a lower risk of water/gas breaks.

The present technique may also be used to determine cumulative attributes, such as pore volume, connected to injector-producer well pairs. Previous attempts to determine this pore volume usually required the use of a threshold value to determine the connectivity between neighboring cells. The present example does not use a threshold. An initial front is propagated through the cells with a user-defined speed for each cell based on the cell's porosity or other attributes that affect the transmissibility of fluids. This example operates by first determining the arrival times of cells in the reservoir from an injection well until a production well is reached, or some other ending condition is met. Next, arrival times are computed from the production well until the injection well is reached, or some other ending condition is met. The two times are added together for each individual cell and each cell's total time provides the optimum or the shortest travel time between the injection well and the production well by way of that cell. The desired attributes of cells with a total travel time less than a preselected value (or connectivity greater than a preselected value) are totaled to give an indication of the cumulative attribute, i.e., pore volume, connected to the well pair.

Specifically, this technique of determining the pore volume in an injector-producer well pair operates as follows. First, a speed function is created using porosity data for the reservoir.

Figure 14:
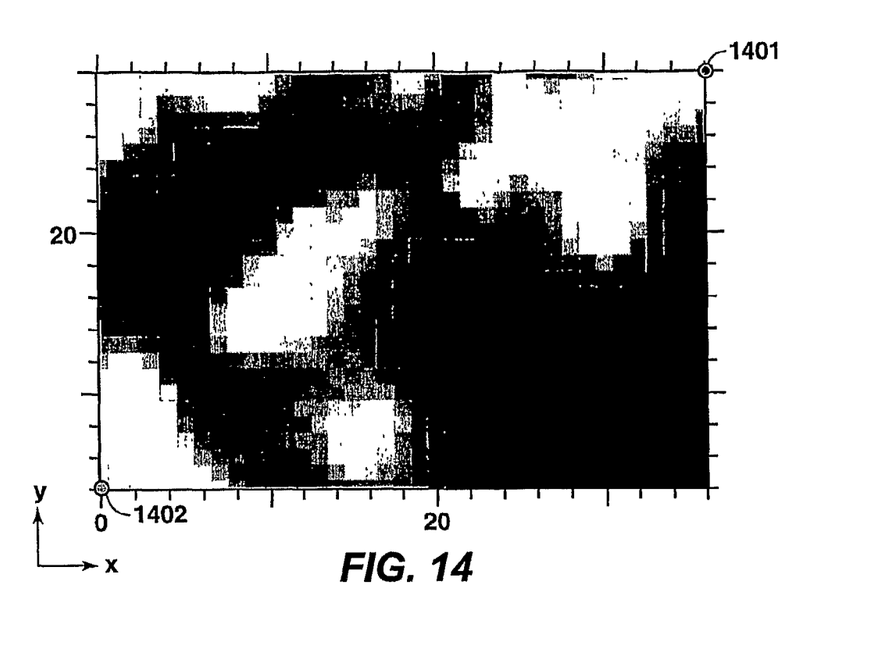
FIG. 14 illustrates a two-dimensional model of a production and injection well pair with the seismic derived porosity of the reservoir shown in gray scale.
Figure 15:
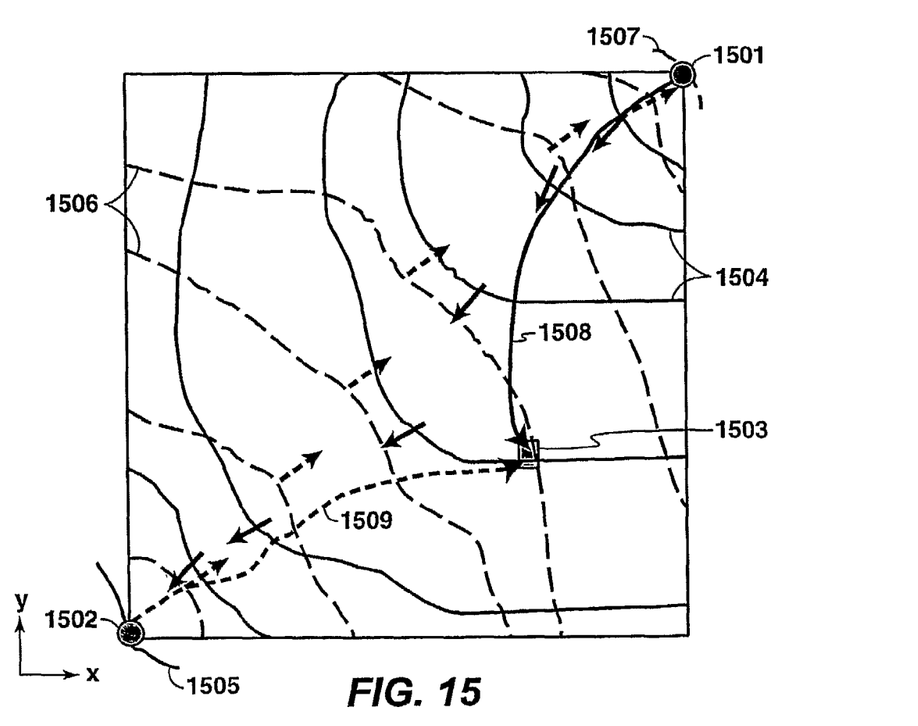
Figure 16:
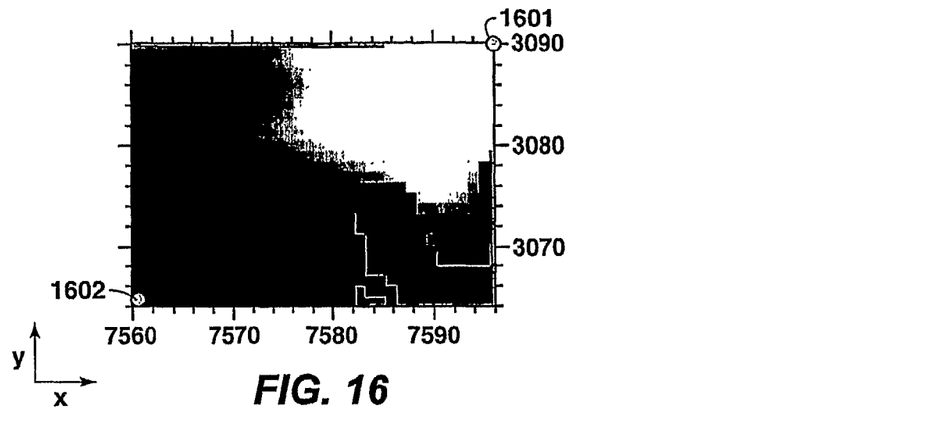
FIG. 16 illustrates the arrival times from an injection well shown in gray scale.
Figure 17:
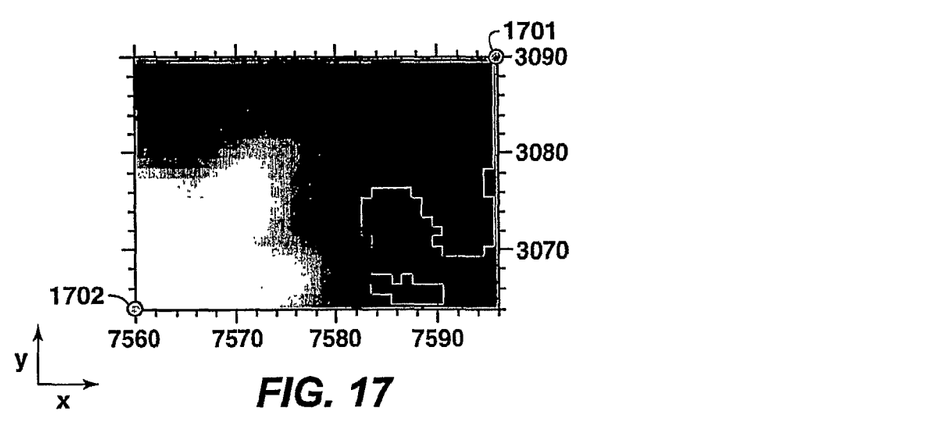
FIG. 17 illustrates the arrival times from a production well shown in gray scale.

Porosity values for seismic scale model of a reservoir are shown in gray scale in FIG. 14 (lighter shades mean higher porosity). 1401 indicates the location of an injection well, and 1402 indicates the location of a production well. Next, an initial front is propagated from an injection well (1501 in FIG. 15) until it reaches a production well (1502), or some other ending condition is met. These fronts, such as $\Gamma_{injection,intermediate}$ (1504) and $\Gamma_{injection,max}$ (1505) are shown in the solid line contours in FIG. 15. As a result, the travel times, $T_{injection}(x, y)$, or $T_{injection}(x, y, z)$ in three dimensions, have been calculated at each cell and are shown in gray scale in FIG. 16. The production well (1602) is in the lower left corner and the injection well (1601) is in the upper right corner. A cell's $T_{injection}(x, y)$ represents the travel time from the injection well to that individual cell. Next, as shown in FIG. 15, the initial front is propagated from the production well (1502) until it reaches the injection well (1501) or some other ending condition is met, computing $T_{production}(x, y)$, or $T_{production}(x, y, z)$ in three dimensions at each cell. These fronts are shown in the dashed line contours in FIG. 15 as $\Gamma_{production,intermediate}$ (1506) and $\Gamma_{production,max}$ (1507). The computed travel times, $T_{production}(x, y)$, are illustrated in gray scale in FIG. 17 (1701 indicates the injection well and 1702 indicates the production well). A cell's $T_{production}(x, y)$ represents the travel time from the production well to that individual cell. Next, $T_{injection}(x, y)$ and $T_{production}(x, y)$ are added together at each cell $(x, y)$ to compute the total travel time, $T_{total}, (x, y)$ (1503). This total represents the total travel time from the injection well to the production well by way of that cell. A cell's $Q_{total}(1/T_{total}(x, y))$ would represent the connected quality between the production well and injection well.

Figure 18:
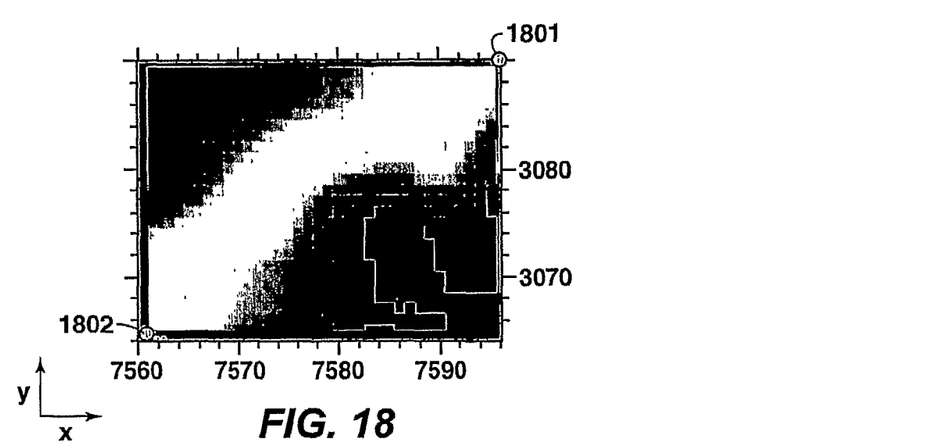
FIG. 18 illustrates connectivity characterization when the arrival times of each cell from an injection well and a production well are totaled.

FIG. 18 shows $T_{total}(x, y)$ for the example two-dimensional model. The gray shading of a cell at (x, y) represents the value of $T_{total}(x, y)$ and indicates the travel time or the connective quality of a path from the injection well (1801) to the production well (1802) via a cell at (x, y). Lighter shades indicate lower travel times and higher connectivity and darker shades indicate higher travel times and lower connectivity. To compute the pore volume that can be contacted by a displacing fluid, all the pore volumes of cells that have a connected quality $Q(x, y) \propto 1/T_{total}(x, y)$ greater than $Q_{min\_total}$ are added. One advantage of this method is the ease with which one can analyze the effect of $Q_{min\_total}$ on the pore volume and the shape of the affected geobody. Again, it should be noted that the displaceable pore volume estimated from this method does not consider the more computationally intensive dynamic pressure gradient that needs to be considered for a more accurate prediction of fluid movements. In this example, multiple fronts could also be propagated from multiple reference cells in the reservoir model and multiple connectivities could be totaled to determine multiple travel times for various reference cells by way of any individual cell.

Figure 19:
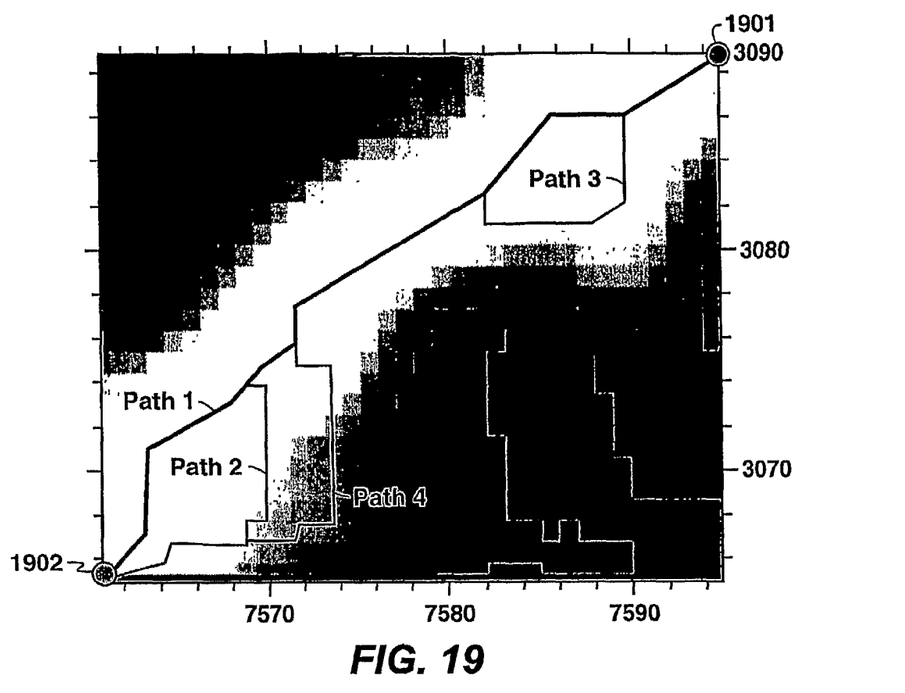
FIG. 19 illustrates the identification of alternative or next best paths between two locations.

This technique can also be used to determine the optimum path between two cells via any desired cell and also the nth best path between two cells. FIG. 15 shows the corresponding optimum path between the production well and the injection well via (x, y), shown as combination of two paths found: path 1508 from injection well to a cell at (x, y) and path 1509 from production well to the cell at (x, y). This is determined by first determining the gradient of $T_{production}(x, y)$ and working backwards through the gradient from a desired cell until the production well is reached. Next, the gradient of $T_{injection}(x, y)$ is determined and followed backwards from the desired cell until the injection well is reached. The $n^{th}$ best path can be determined using this technique by ranking the cells by their $Q_{total}$. The $n^{th}$ best path would be determined by choosing the $n^{th}$ ranked cell as the desired cell. This is illustrated in FIG. 19. FIG. 19 shows $T_{total}(x, y)$ in gray scale and the best 4 paths connecting the production (1902) and injection (1901) well pair. These paths are found by computing the optimum paths that passes through the four cells with the lowest four values of $T_{total}(x, y)$.

Figure 20:
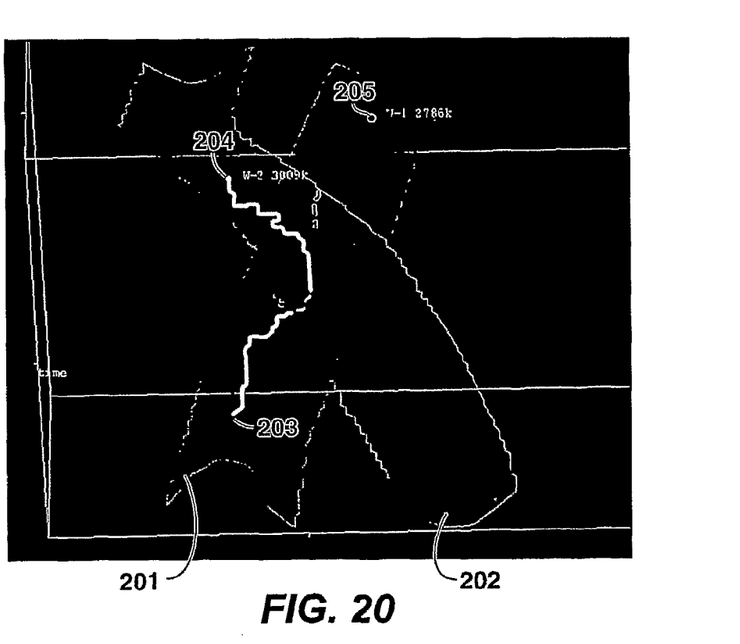
FIG. 20 illustrates connected pathways and the connected quality between an injection well and multiple production wells in overlapping channels.

The present technique may also be used to assess the risk of flooding an unintended well with injection water while injecting water to drive oil to a target well. When reservoir geometry is complex such as in an overlapping channel area, it is of integral importance in developing a production strategy to understand connected pathways among multiple wells. The following is an example of using the present technique to understand connected pathways between overlapping channel areas. FIG. 20 shows synthetically generated overlapping channels: channel 201 and channel 202. An injection well is located at the lower part of the channel 201 at 203 and there are production wells 205 and 204 penetrating channel 201 and channel 202. In this example, it is desirable to find out if there are connected pathways between the injection well and the production well 204 at channel 202. Using the present technique of determining arrival times from injection and production wells, pathways were discovered from the injection wells to the production wells. The pathways are indicated in FIG. 20 by the white and black lines. Using this technique, an indication can be provided that the quality of the connectivity to the production well 205 in channel 201 is better than that to the production well 204 in channel 202.

While the present invention has been described with reference to an exemplary embodiment thereof, those skilled in the art will know of various changes in form that may be made without departing from the spirit and scope of the claimed invention as defined in the appended claims. For example, the person skilled in the art will recognize that different techniques for modeling the reservoir may be used, such as tetrahedrons or other three-dimensional cells. As another example, the person skilled in the art will recognize that the travel times or arrival times generated are interchangeable with their inverse, connectivity values. All such variations will be deemed included in the following claims.

What is claimed is:

1. A method for analyzing the connected quality of a hydrocarbon reservoir, said method comprising:

(a) obtaining a model of a portion of the reservoir and dividing it into cells, each cell having a volume and some attributes;

(b) assigning a speed function to a portion of the cells, the speed function representing how hydrocarbons or other fluids flow through the cells;

(c) choosing a reference cell;

(d) determining a connectivity between cells in the reservoir by solving an Eikonal equation, describing a propagating front in a heterogeneous medium, said front progressing outward from the reference cell until an ending condition is met, said Eikonal equation being solved by a fast marching method with propagation velocity as a function of spatial position being provided by the speed function; and (e) characterizing regions of the reservoir by their connective quality to the reference cell using the connectivity.

2. A method according to claim 1 wherein:
the ending condition is met when a preselected minimum connectivity is reached.

3. A method according to claim 1 wherein:
the ending condition is met when a preselected distance from the reference cell is reached.

4. A method according to claim 1 wherein:
the ending condition is met when the connectivity of a target object cell is determined.

5. A method according to claim 1 further comprising:
determining an optimum connected path from the reference cell to another cell in the reservoir by generating a gradient of the connectivity of the cells and backtracking from said another cell to the reference cell using the gradient.

6. A method according to claim 5 further comprising:
determining a cumulative attribute along the optimum connected path by totaling a desired attribute of cells along the path.

7. A method according to claim 5 further comprising:
determining the tortuosity of the optimum path by dividing the length of the path by the shortest line between the reference cell and said another cell.

8. A method according to claim 1 further comprising:
totaling desirable attributes of all cells with a connectivity greater than a preselected value.

9. A method according to claim 1 wherein step (c) comprises choosing multiple reference cells at different locations from each other in the reservoir the method further comprising:
performing step (d) and step (e) with respect to each reference cell chosen; and
individually totaling the connectivities for each cell in the reservoir with respect to the reference cells chosen in step (c).

10. A method according to claim 9 wherein:
the ending condition is met when a preselected minimum connectivity is reached.

11. A method according to claim 9 wherein:
the ending condition is met when the connectivity of a target object cell is determined.

12. A method according to claim 9 wherein:
the ending condition is met when a preselected distance from the reference cell is reached.

13. A method according to claim 9 further comprising totaling desirable attributes of cells with a total connectivity greater than a preselected connectivity value.

14. A method according to claim 9 further comprising:
determining an optimal path between a first and a second reference cell by way of a desired cell by:
generating a gradient of connectivities with respect to the first reference cell and backtracking from the desired cell to the first reference cell using the gradient; and
generating a gradient of connectivities with respect to the second reference cell and backtracking from the desired cell to the second reference cell using the gradient.

15. A method according to claim 14 further comprising:
determining an nth optimal path between a first and a second reference cell by:
ranking the cells in the reservoir by the cells' total connectivity;
choosing the cell or cells with the nth ranked total connectivity as the desired cell.

16. A method of claim 1 wherein step (c) comprises choosing a portion of the cells in the reservoir as reference cells the method further comprising:
performing step (d) and step (e) with respect to each reference cell chosen; and
determining a total desirable attribute, $V_{boundary}$, for each reference cell by totaling desirable attributes of all the cells in the reservoir with a connectivity with respect to the reference cell greater than a preselected value.

17. A method according to claim 16 wherein:
the ending condition is met when the connectivity of a target object cell is determined.

18. A method according to claim 16 wherein the cells have corresponding cell indices wherein:
the portion of the cells chosen as reference cells comprises cells for which the total of the corresponding cell indices may be evens the method further comprising:
determining a $V_{boundary}$ for the cells in the reservoir not chosen as reference cells using an average of the $V_{boundary}$ of neighboring cells that were chosen as reference cells.

19. A method according to claim 16 wherein the cells have corresponding cell indices wherein:
the portion of the cells chosen as reference cells comprises cells for which the corresponding cell indices are all even or all odd, the method further comprising:
determining a $V_{boundary}$ for the cells in the reservoir not chosen as reference cells using an average of the $V_{boundary}$ of neighboring cells that were chosen as reference cells.

20. A method according to claim 1 wherein:
the speed function is determined using geological attributes.

21. A method according to claim 1 wherein:
the fast marching method is adapted to restrict wave propagation to one or more specified directions.

22. A method according to claim 21 wherein:
the speed function is determined by a direction of wave propagation of the fast marching method.

23. The method of claim 1 wherein:
the speed function is generated using porosity data.

24. The method of claim 23 wherein:
the speed function is a linear function.

25. The method of claim 23 wherein:
the speed function is a nonlinear function.

26. The method of claim 23 wherein:
the speed function is a step function.

27. The method of claim 1, further comprising:
producing hydrocarbons from the characterized regions.

* * * * *

UNITED STATES PATENT AND TRADEMARK OFFICE
CERTIFICATE OF CORRECTION

PATENT NO. : 7,565,243 B2
APPLICATION NO. : 11/884695
DATED : July 21, 2009
INVENTOR(S) : Chul-Sung Kim and Mark Dobin It is certified that error appears in the above-identified patent and that said Letters Patent is hereby corrected as shown below:

Col. 14, Claim 18, line 21, replace "evens" with --even,--.

Signed and Sealed this

First Day of June, 2010

David J. Kappos
*Director of the United States Patent and Trademark Office*